May 5, 1931.  G. C. CARSON  1,803,663
METHOD AND MEANS FOR PRODUCING BLISTER COPPER
FROM COPPER BEARING MATERIALS
Filed April 6, 1926
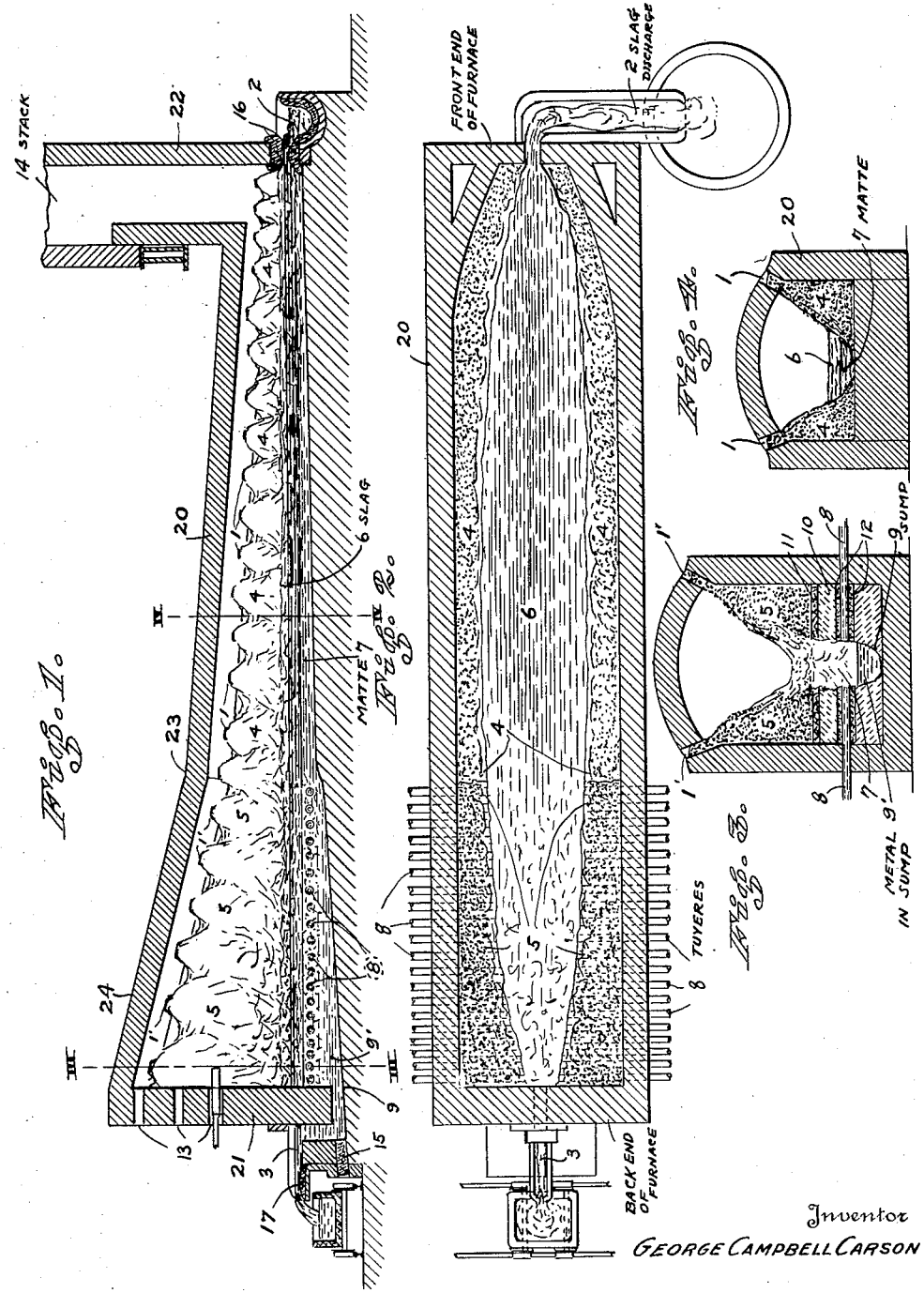
Inventor
GEORGE CAMPBELL CARSON
By Miller & Boyken
Attorney Patented May 5, 1931

1,803,663

UNITED STATES PATENT OFFICE

GEORGE CAMPBELL CARSON, OF SAN FRANCISCO, CALIFORNIA, ASSIGNOR TO CARSON INVESTMENT COMPANY, A CORPORATION OF NEVADA

METHOD AND MEANS FOR PRODUCING BLISTER COPPER FROM COPPER BEARING MATERIALS

Application filed April 6, 1926. Serial No. 100,068.

My invention relates to producing and bessemerizing copper matte in the production of blister copper. The prior practice was to smelt copper bearing materials such as ores, concentrates, calcines, flue dust or the like; from which the copper was collected into mixed copper and iron sulphides termed, "copper matte," made by melting the materials in a reverberatory furnace.

In melting, the copper matte settled out from the other melted substances to the bottom of the furnace and was drawn from the furnace in a molten condition, then transferred to a converter where the molten sulphides were bessemerized by blowing through them a current of air to oxidize the iron sulphide into ferrous oxide and sulphur dioxide. The sulphur of the copper sulphide was also oxidized to sulphur dioxide leaving blister copper as the product.

During the bessemerizing operation the ferrous oxide was slagged by supplying silica to the molten contents of the converting vessel which combined with it forming ferrous silicate, which rose to the surface as slag and which was skimmed off at intervals during the operation.

After the iron sulphide was oxidized the oxygen of the air being blown into the remaining copper sulphide combined with the sulphur leaving in the converter vessel molten copper; called "blister copper".

During the operation there were large amounts of shots of matte, dust and metallic fumes blown out of the mouth of the vessel; furthermore, the operation was difficult to control. When oxidation became too rapid the temperature of the molten contents rose to where the higher silicates formed and the power of silica to combine with extra quotas of the base was produced. This condition permitted silica added to unite with the ferrous oxide to also attack the lining of the vessel if the vessel was basic lined; or, if the vessel was lined with silica, it caused the basic ferrous oxide to dissolve double its ratio of silica from the lining, thus; in either case rapidly destroying the lining. On the other hand if the molten sulphides were blown too cold, accretions of magnetite formed upon the inner walls of the vessel, reducing its capacity, and gathering at the orifices of the tuyères, impeding the blast of air, and entailing much labor punching tuyères.

A further evil feature was that the slag produced by the operation was so foul that it had to be returned to the ore smelting furnace to recover the values it contained, which added to the cost of the operation.

Another loss was during the finishing of a batch of matte to blister copper, there being insufficient sulphur in the matte before the tuyères to absorb all of the oxygen of the blast, a large amount of air escaped without having served any useful purpose.

Another undesirable feature of the prior method of converting copper matte into blister copper was the hazard to life and limb in transporting the molten matte between the smelting furnace and the converter, spills and explosions of matte occurred which sometimes resulted fatally.

By my method and means of producing blister copper from copper bearing sulphide materials as herein described, I eliminate the above separate steps of converting copper matte into blister copper and avoid the objections of the prior practice referred to by the following method of procedure:—

I prefer to smelt the material in accordance with my Patent No. 1,296,478 of March 4th, 1919, in which the material to be smelted is banked along the inner walls of the furnace chamber and tuyères penetrate the embankments to supply air for oxidation and bessemerization.

The present invention differs from the invention therein described in that the blister copper is automatically separated from the slag at the back end of the furnace while the slag is drawn off at the front end. The roof of the furnace is elevated at the back end for the purpose of forming high embankments of silica at the sides of the furnace chamber, and in order that the angle of repose of the material may spread the bases of the embankments nearer to the center of the furnace chamber, thus confining the matte to be bessemerized into a narrower valley than would be formed by lower embankments.

A further difference lies in the construction of the hearth, which is made to slope downwards from the front end to the back end and at which latter place the blister copper emerges, while the slag is skimmed at the front end. The sloped hearth forms a depression for the purpose of collecting and bessemerizing the matte, and a sump for the collection of blister copper produced by the bessemerization of the matte.

A further difference lies in the method of charging the silica or silicious ores to slag the ferrous oxide produced, which consists in charging it at the rear end of the furnace to form sloping embankments of silica between which the matte is confined, thereby maintaining the chemical action of bessemerizing copper matte between constantly renewable sloped acid walls, thus permitting the use of common fire brick walls for the furnace body.

The blister copper flows from the furnace through a molten metal well into molds. By this arrangement a new process of smelting and bessemerizing is effected which prevents magnetite accretions from forming in the back or smelting end of the furnace.

Heretofore in smelting in reverberatory furnaces employing my side-charging feature, the magnetite of the charge and that produced in smelting accumulates in the valley between the charge embankments and builds up as an accretion of sufficient thickness to insulate the base of the embankments from the smelting temperature thus rendering that amount of heating surface of the charge ineffectual.

By my present construction the slag and matte flow in countercurrents, and a thin stratum of slag is secured by lowering the slag notch at the skimming door to any desired point relative to the metal overflow at the opposite end, thus exposing the maximum amount of ore embankments above the bath to the furnace heat. The depth of the bath is controlled by the height relation of both slag discharge and metal overflow to the bottom of the furnace.

These two discharges control the depth of the bath within the furnace. By raising both discharges the depth of the bath is increased and by lowering them the depth is made shallower. The shallow bath exposes the greatest amount of material to the smelting temperature while the deeper bath affords better settling of the matte. The level of the matte before the bessemerizing tuyères, and the depth of blister copper within the metal sump is determined by the thickness of the slag blanket upon the bath and is controlled by raising or lowering either one or both of the discharges. If it is desired to secure a little better settling; or if it is found that the tuyères are impinging into the blister copper, the slag discharge is raised which produces a thicker slag stratum and forces blister copper from the sump through the metal well into the copper molds and depresses the stratum of matte within the sump. Should at any time matte pass through the metal well and be found with the discharged metal the discharges are raised and the blowing equipment is speeded up to supply oxygen for oxidation of the increased matte fall.

The raising or lowering of the discharges of the slag and the metal gives complete control of the smelting and bessemerizing of the matte. Should the material being treated become deficient in sulphide to yield enough matte to absorb the oxygen being delivered to the tuyères and cannot be increased by feeding additional raw sulphides to the smelting furnace for the purpose of neutralizing the excess of oxygen, then some of the tuyères are plugged with clay in the well known manner to stop the flow of enough air from entering the bath to correct the excessive oxidation.

Should it become necessary to temporarily cease smelting for any reason, the slag and matte contents of the furnace are tapped through a tap-hole at the bottom of the metal well and allowed to run into a sand bed or ladles so as to prevent the forming of accretions before the tuyères by overblowing; and to prevent slag and matte from filling the tuyères when the blast blowing through them is stopped. Or in the event that the material being treated does not supply sufficient metal to produce a continuous flow through the metal well, then the overflow is abandoned and the metal is tapped at intervals through a tap-hole the same as is done from the crucible of a blast furnace.

The above and other improvements over the old means and methods of producing blister copper are illustrated in the accompanying sheet of drawings in which Figure 1 is a longitudinal section in elevation through the furnace showing the material which yields the copper matte charged along the furnace walls between the stack and tuyères and silica charged along the walls over the tuyères. Slag is shown flowing out of the front end of the furnace and matte in an opposite direction towards the tuyères, while blister copper is shown at the bottom of the sump and flowing through the metal well out into a mold.

Figure 2 is a horizontal section of the furnace of Figure 1 taken at the slag line and showing the portion of the furnace in which the matte yielding material is charged and the portion of the furnace in which silica is charged and bessemerizing is effected.

Figure 3 is a cross section upon the line III—III of Figure 1 and shows the copper matte between the silica embankments undergoing oxidation from air forced through the tuyères at the sides toward the back end of the furnace, and the blister copper collected in the bottom of the sump below the tuyères.

Figure 4 is a cross section of the furnace upon the line IV—IV of Figure 1 showing the ore or matte producing material charged at the sides of the furnace chamber and the slag and matte accumulated in the valley between the ore embankments.

Like reference numerals refer to like parts in all figures. In the figures the buck-staves, hoppers and other usual appurtenances of furnace construction have been omitted for clarity in the drawings as being well understood. The feeding ports through which the smelting charge is fed to the furnace 20 are shown at 1 and the ports through which the silica is fed are shown at 1'. The slag discharge is shown at 2 and the copper discharge and metal well shown at 3. The smelting or ore embankments which yield the matte are shown at 4 and the silica embankments which supply silica to flux ferrous oxide produced in bessemerizing the matte are shown at 5. The slag stratum is shown at 6. The matte stratum is shown at 7. Tuyères penetrating the matte stratum are shown at 8. The blister copper stratum collected in the metal sump 9 is shown at 9'. A belt of basic material in the bessemerizing end of the furnace is shown at 10, Figure 3. Layers of chromite to insulate the silica from the basic lining below are shown at 11. At 12 is also shown chromite in which I prefer to embed the tuyères. At the back end 21 of the furnace at 13 Figure 1 is shown burner and air ports for supplying fuel and air for combustion; while at the front end 22 a flue is shown at 14. A tap-hole to drain the furnace is shown at 15. At 16 and 17 respectively is shown clay by which the heights of slag and metal overflows respectively are controlled, though it is manifest that any desired means for this purpose may be employed.

In operating the furnace the charge to be treated is fed through the feeding ports 1, by means of the usual hoppers not shown, and the silica to slag the ferrous oxide is fed through the feeding ports 1', and form sloping embankments along the side walls of the furnace chamber as shown and which accumulate heat until the melting temperatures are attained. The melted materials from the smelting charge accumulate at the foot of the embankments where the matte settles out to the bottom and the slag flows through the slag discharge 2.

The matte flows in the opposite direction towards the sump 9 and gathers in a stratum 7 before the tuyères 8. Air is blown through the tuyères to oxidize the iron and sulphur of the matte which in conjunction with the heat of the fuel and air delivered through the ports 13 develops a very high temperature in the bessemerizing region of the furnace and prevents the formation of magnetite accretion by melting and reducing the magnetite to ferrous oxide thus insuring open tuyères and saving much of the labor of punching tuyères. I prefer to incline the arched roof of the furnace chamber from point 23 adjacent the last feeding port for sulfide material 4 upwards to the rear end walls as shown at 24 above the embankments of silicious material in order to secure a larger combustion chamber permitting the burning of a greater amount of fuel and to elevate the roof from the spray and fumes of lead and zinc produced by bessemerization; and to permit thicker and higher banks of silica along the walls to supply the acid for neutralizing the ferrous oxide.

I prefer to make this incline sufficient to cause the angles of repose of the embankments of silica next to the end wall to meet each other above the tuyères. However, my method is also operative with a horizontal roof and particularly so when the silicious material fed to the furnace contains enough base to form the subsilicates, or when it is of a nature to form a flatter angle of repose than is formed by common quartz.

Having thus described my invention what I claim as new and desire to secure by Letters Patent is:—

1. The method of smelting sulphide copper ores which comprises forming adjacent embankments of ore and silicious material and smelting the ore to copper matte for flow along the base of the ore embankment and along the base of the embankment of silicious material, of bessemerizing the matte adjacent said embankment of silicious material for fluxing the ferrous oxide therewith, and withdrawing the blister copper from thereunder and the slag from the surface thereof.

2. The method of smelting sulfide copper ores which comprises forming adjacent embankments of ore and siliceous material and smelting the ore to copper matte for flow along the base of the ore embankment and along the base of the embankment of silicious material, of bessemerizing the matte adjacent said embankment of silicious material for fluxing the ferrous oxide therewith, and withdrawing the blister copper from thereunder and the slag from the surface thereof in opposite directions.

3. The method of smelting sulfide copper ores which comprises subjecting the same to heat in a furnace to form a horizontally flowing stratum of copper matte, of bessemerizing the matte while thus flowing alongside a bank of silicious material and creating an opposite flowing stratum of slag.

4. The method of smelting sulfur and iron bearing copper ores, which comprises forming confronting piles of ore to form a valley therebetween and terminating with piles of silicious material, of smelting the ore to flow in said valley, and of bessemerizing the matte in the valley adjacent the base of the piles of silicious material.

5. The method of smelting sulfur and iron bearing copper ores, which comprises forming confronting piles of ore to form a valley therebetween and terminating with piles of silicious material, of smelting the ore to flow in said valley, of bessemerizing the matte in the valley adjacent the base of the piles of silicious material and of withdrawing the blister copper from one end of the valley and the slag from the other end.

6. The method of converting copper matte into blister copper consisting of confining the copper matte between sloping embankments of silica and delivering beneath said sloping embankments of silica and into said matte a current of air for the purpose of bessemerizing said matte into blister copper, and collecting and drawing off the copper at a point below said embankments.

7. In the reduction of ore, a reverberatory furnace chamber of elongated shape provided with a bottom slanting downwardly toward one end and terminating in a metal sump, means for admitting ore for banking along the side walls of the chamber, means for smelting the charge, means for bessemerizing the smelted material at the lower end of the chamber, means for withdrawing the metal from the sump at the lower end of the chamber and for flowing the slag from the other end.

8. In the reduction of ore, a reverberatory furnace chamber of elongated shape provided with a bottom slanting downwardly toward one end and terminating in a metal sump, means for admitting ore for banking along the side walls of the chamber, means for smelting the charge, means for bessemerizing the smelted material at the lower end of the chamber, means for withdrawing the metal from the sump at the lower end of the chamber and for flowing the slag from the other end, the height of the chamber roof being substantially increased by upward slanting above the bessemerizing area.

9. A furnace with an area therein for bessemerizing copper matte, tuyères projecting into the lower region of said area, basic material embedding said tuyères, and a pile of siliceous material for slagging the oxide supported by said basic material.

10. A furnace with an area therein for bessemerizing copper matte, tuyères projecting into the lower region of said area, basic material embedding said tuyères, and a pile of siliceous material for slagging the oxide supported by said basic material, a layer of chromite provided between said basic material and said siliceous material.

11. A reverberatory furnace of elongated shape having a substantially continuous hearth, means for banking a charge along the walls to the rear end of the hearth, and tuyères arranged along the sides of the rear portion only of the furnace at the bottom of the banked material.

GEORGE CAMPBELL CARSON.